April 20, 1965   H. L. CARPENTER, SR   3,179,321
FIBER DRUMS HAVING SLIP-ON CLOSURES
Original Filed June 4, 1956   2 Sheets-Sheet 1

INVENTOR.
HERBERT L. CARPENTER, SR.
BY
Kane, Dalsimer and Kane
ATTORNEYS

April 20, 1965   H. L. CARPENTER, SR   3,179,321
FIBER DRUMS HAVING SLIP-ON CLOSURES
Original Filed June 4, 1956    2 Sheets-Sheet 2

INVENTOR.
HERBERT L. CARPENTER, SR.
BY
Kane, Dalsimer and Kane
ATTORNEYS

United States Patent Office 3,179,321
Patented Apr. 20, 1965

3,179,321
FIBER DRUMS HAVING SLIP-ON CLOSURES
Herbert L. Carpenter, Sr., Amityville, N.Y., assignor to
The Greif Bros. Cooperage Corporation, Delaware,
Ohio, a corporation of Delaware
Original application June 4, 1956, Ser. No. 589,025.
Divided and this application Apr. 19, 1962, Ser.
No. 188,622
1 Claim. (Cl. 229—5.7)

The present invention relates to structurally and functionally improved fiber drums having slip-on closures; and this application is a division of my application S.N. 589,025, filed June 4, 1956, now abandoned, with copending applications leading to U.S. Patent 3,042,288 granted July 3, 1962 and U.S. Patent 3,104,599 granted September 24, 1963 being continuations-in-part thereof.

Fiber drums and similar containers are usually constructed from convolutely or spirally wound laminated layers of fibrous material, as for example kraft paper. They are commonly utilized during shipping and storing a variety of materials, articles or bulk substances such as raw materials, bulk chemicals, biologicals, pharmaceuticals, dairy products, confectionary supplies, food stuffs, condiments, poultry feeds, molding powders, plastics, synthetic resins, munitions, sensitive instruments, including electronic tubes and the like, to mention a few.

These fiber drums and containers are frequently subjected to rough handling. In this connection, during transit they are often dropped from shipping platforms or tailboard of trucks and may even experience the impact of other containers and articles upon them during these periods. Additionally, loaded containers are often stacked one upon the other, thereby placing further stress upon their walls, particularly those of the lower most containers. Exposed to such conditions, fiber drums and containers must be of strong, sturdy construction and capable of withstanding the abuse to which they are subjected during shipment and in storage.

Heretofore, many cylindrical fiber drums and containers with transversely circular cross sections have been sufficiently strong to withstand misuse and abuse. However, these cylindrical drums and containers have the disadvantage of being uneconomical due to space requirements. Thus, during shipment and storage there is a considerable amount of waste space between the cylindrical side of the adjacent drums of this type. As such drums are stacked one upon the other, this space is unduly multiplied. Inevitably, an appreciable amount of waste material additionally results from the manufacture of the bottom closures and heads for such fiber drums and containers.

Non-cylindrical containers having a plurality of sides, as for instance rectangular containers, are relatively efficient in their utilization of shipping and storage space since they may be placed in a substantially contiguous relationship with minimum space wasted between their neighboring sides. However, other difficulties and disadvantages are encountered with containers having this configuration. These containers generally possess insufficient strength to withstand the use and abuse normally met during contemplated shipment and storage. In this connection, there is a tendency for the sides of these rectangular fiber containers to become transversely concave and, consequently, collapse inwardly when subjected to stresses and strains imparted and experienced under adverse conditions. As a result of the developed concave contour of the sides, it is extremely difficult to maintain a satisfactory and relatively tight seal between the head or closure and the body of the container. The danger of content contamination, as well as inevitable sifting and loss of certain types of container content, may be encountered.

It is an object of my present invention to overcome the prior difficulties found in the fiber drum and container field and therefore provide improved fiber drums having convex sides and rounded corners, with closures and heads readily slidable in place whereby: stresses and strains normally encountered during shipment and storage can be withstood; as a result of this improved rugged and strong construction, storage and shipping space is efficiently utilized because of the minimum waste space between the sides of the adjacent drums of this type; and the drums may be readily opened and closed, easily sealed as well as resealed, and are filled and dispensed expeditiously.

It is another object to provide an improved top and bottom closure assembly for such drums whereby the bottom closure and head may be readily applied with the bottom closure firmly anchored in place and the top head readily slipped off and on and then releasably locked in place but, at the same time, firmly held against accidental opening or displacement, so that content pollution and contamination is effectively minimized.

It is a further object to provide an improved slip-on bottom closure and head for such drums of simple rugged construction wherein the head readily manipulated when desired in order to open and close the drum and securely hold it in its closed position as well.

Further objects of my invention include the provisions of a fiber drum having a plurality of sides and a slip-on bottom closure and head wherein the drum is readily opened and closed and easily sealed as well as resealed; wherein the drum has a full open top facilitating the filling and dispensing of its contents; wherein the drum and head are releasably latched to one another through the employment of simple and efficient closure lugs; wherein the drums are provided with sanitary and substantially smooth, flush interiors for efficient product handling; wherein the drum provides for easy nesting to conserve storage and shipping space; and wherein the drum, together with its bottom closure and head, are so constructed and arranged that they will inherently minimize any detrimental effects of container "breathing" due to changes in the ambient; and wherein a slip-on head is adapted for use with the drum such that forces exerted or applied at the four corners of the fiber drum bow its convex side outwardly and into tight engagement with the inner surfaces of the head.

Other objects and advantages will become apparent from the following description of my invention which is to be taken in conjunction with the accompanying drawings illustrating a somewhat preferred embodiment thereof and in which.

Figure 1:
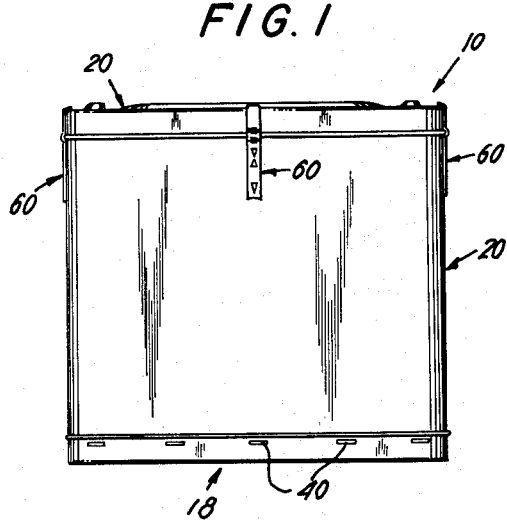
FIG. 1 is a side elevational view of a drum with bottom closure and top head assembled thereon in accordance with the teachings of my invention in which the bottom closure is anchored in place and the top head is releasably locked in a closed position.
Figure 2:
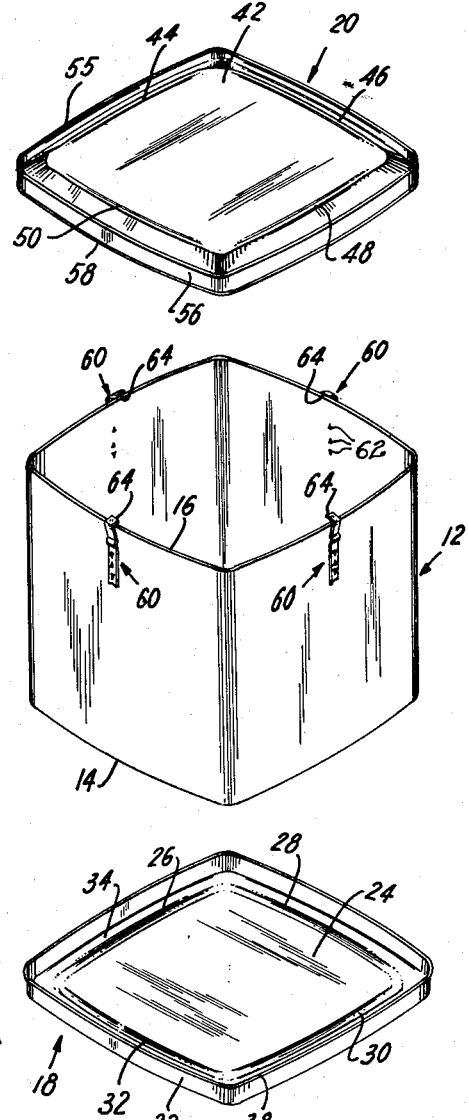
FIG. 2 is an exploded perspective view of the drum of FIG. 1 with certain parts removed.
Figure 3:
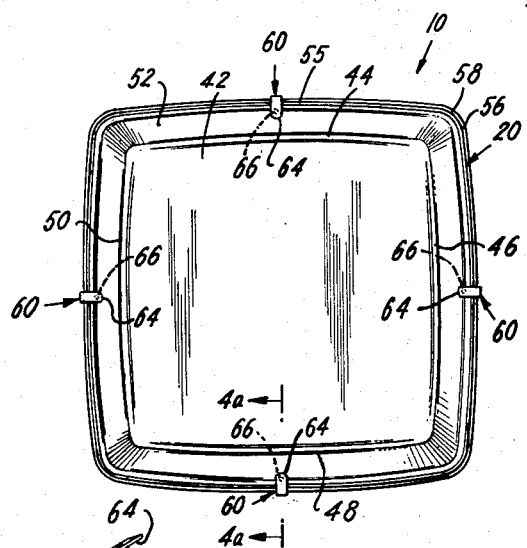
FIG. 3 is a top plan view of the drum of FIG. 1.
Figure 5:
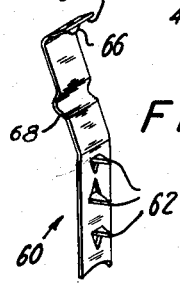
FIG. 5 is a perspective view of a lug employed in latching the head in place.

In carrying out my invention I have found that fiber drum 10 is relatively efficient in its use of space and, at the same time, sturdy strong and serviceable. Thus, the fiber drum 10 embraces a body having a plurality of sides, preferably four, which are transversely convex and connected together by rounded corners. It should be understod that drums having different numbers of sides can be employed by adapting the principles of my invention and, accordingly, be efficiently stored in contiguous relationship and possess the optimum characteristics of the illustrated drum. Each of the sides of my drum are transversely convex so that the sides bow outwardly. By forming the sides in this manner, I eliminate the tendency of the sides to bow inwardly and thus collapse as is the case with rectangular fiber containers. This greatly increases the strength of the drum shell by attenuating and properly distributing applied forces and, in addition, assures a more secure fit and superior seal between the drum shell and its closures. Thus, pressure acting on the drum exterior is transmitted through the convex side as well as corners. The directly affected parts will resist such pressures more effectively and, due to the stress distribution, will cause the remaining sides and corners to accept their share of the stresses applied and, consequently, deform by bowing outwardly, thereby producing a much tighter and stronger seal with the drum closures. In the case of square or concave side walls, force applied to the corners or side walls will cause flexing of the side walls in an inward direction and, consequently, reduce the tightness and effectiveness of the container closure.

The degree of curvature of the convex side walls may be varied considerably. As the degree of curvature increases, their efficiency in the use of space decreases since greater waste space will be inevitable between the side walls of shells stored in contiguous relationship. On the other hand, the radius of curvature of the side walls should be selected so that they will be capable of adequately accepting the contemplated loads and pressure. In this connection, it may be desirable to increase the thickness of the side walls in an effort to maintain the radius of curvature at a maximum. I have found that as the size of the container increases, optimum results are obtainable by merely thickening the side walls instead of decreasing the radius of curvature. Thus, the radius of curvature of the side walls of the contemplated size of drums will not differ appreciably, but their effective thickness may range between definite practical limits.

Additionally, I have found that the side walls should be integrally connected together by convexly rounded corners, substantially as illustrated. By rounding the corners in this fashion, I have found that damage or mutilation of the fibers is avoided at such locations. Controlled stress distribution under the contemplated force applications will also ensue. Naturally, the curvature of the corners may likewise be varied considerably, depending on the size of the drum and contemplated use and abuse.

The closures of my drums are similarly shaped so that the convex arch drum structure will not only prevent inward collapsing of the side walls but will also facilitate provisions for a far more effective seal for their bottom closures and, most important of all, their opened tops. Any force against the corners of the shells will tend to bow the side walls outwardly into tight engagement with the closure head at this end.

Thus, the container 10 includes the drum body or shell 12 formed from convolutely wound, adhesively secured, laminated layers of kraft paper or the like. This shell 12 includes a bottom end 14 and an upper end 16 which are adapted to be closed by a bottom closure 18 and head 20, respectively, both of which may for example be fabricated from sheet metal.

The bottom closure includes a disc from which extends integrally a transverse depending apron or skirt 22. The disc includes a substantially flat central portion 24 having at its periphery, four interrupted downwardly extending projections 26, 28, 30 and 32. These projections are embraced circumferentially by a substantially flat strip 34 at a slightly higher elevation compared with that of the central portion 24. The outer periphery of the strip 34 extends into a downwardly inclined wall 36 which has extending vertically therefrom the apron 22. The configuration of the disc is such that it will cooperate with the head 20 permitting vertical stacking of the drums 10 in an interlocking fashion for relatively easy nesting.

The apron 22 is also formed with transversely convex sides which are joined by rounded corners. Accordingly, with the inner dimensions of the apron 22 being slightly larger than the outer dimensions of the bottom end 14 of the shell 12, the bottom closure 18 may be readily slipped over or telescoped on this end. The upper edge of the apron 22 is rolled outwardly to form a circumferentially extending bead 38 to avoid any sharp edges at this location and permit easy insertion of the shell bottom end 14 into the bottom closure 18. In this connection, the bottom end 14 of the shell 12 is adapted to come to rest adjacent the juncture between the beveled wall 36 and apron 22 at which point a sealing gasket may be interposed, if desired.

In order to anchor the bottom closure 18 to the bottom end 14 of the shell, a number of strategically located rivets or staples 40 may be inserted through the apron 22 and the side walls of the shell 12 in a manner well known in the art.

Referring now to the head 20, it should be understood that its configuration could be identical with that of the bottom closure 18. However, to provide for nesting of the drums 10 and the interlocking of the bottom closure 18 with the head 20 when the drums are stacked vertically, the head 18 will be formed with complementary surfaces for receiving the bottom closure 18 for such purposes. Thus, the head 20 will include a centrally flat portion 42 having at its periphery four interrupted vertical projections 44, 46, 48, and 50. A circumferentially downwardly beveled wall 52 surrounds these projections. A substantially vertical wall 54 extends from the beveled wall 52 at one end and, at the other, extends into the transversely extending downwardly depending apron 56. The juncture 55 defines a rim between the vertical wall 54 and skirt 56 and permits the reception of the upper end 16 of the drum shell 12. At this point a sealing gasket may be inserted, if need be.

The depending apron 56 possesses substantially the same dimensions as the apron 22 of the bottom closure 18. Consequently, the apron 56 will include four transversely convex sides joined by rounded corners, so that the head 20 may be readily slipped over the upper end 16 of the shell 12. The lower peripheral edge of the apron 56 is similarly rolled outwardly and upwardly to provide a bead 58 to facilitate the telescoping of the head 20 over the upper end 16 of the shell and, at the same time, minimize sharp edges. As will be evident shortly, this bead 58 cooperates with surfaces of the releasable locking means for the head 20 in facilitating a latching function. The configuration of the head 20 is such that the surfaces of the bottom closure 18 will conveniently nest to permit vertical stacking of the drums.

A number of attaching clips or lugs 60 may be either riveted to the walls of the shell 12 or, as shown, secured by the collapsing of a number of tongues 62 stamped from the lug itself. Each lug may be formed from sheet metal and preferably possesses a limited degree of flexibility. To this end, the lugs 60 are adapted to advantageously overlap the outer rim 55 of the head 20. In this connection, the lugs 60 will include an inwardly extending panel 64 having a downwardly projecting nipple 66. In a locked position the nipple 66 is adapted to engage the radially inward surfaces of the rim 55. A transverse rib 68 in the lugs 60 accommodate the bead 58.

The panel 64 of the lug 60 may be released from engagement with the closure 20 to permit removal of the closure. Under such circumstances, the panel 64 is shifted slightly upwardly and then outwardly to permit the nipple 66 to ride over or cam against the rim 55. This is also done either simultaneously or sequentially with the other lugs 60 provided on the drum. The head, under these circumstances, may also be lifted and removed from the upper end 16 of the shell.

Figure 4A:
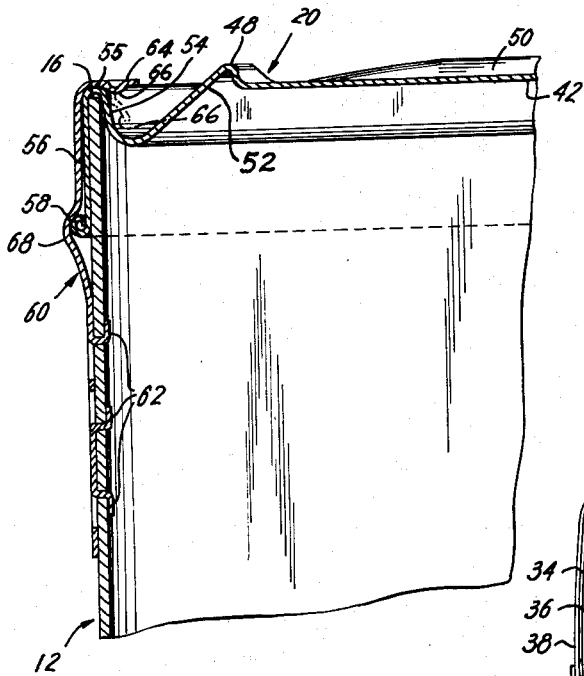
FIG. 4a is an enlarged fragmentary sectional view taken along the line 4a—4a, FIG. 3 showing the lugs securely latching the head in a closed position.
Figure 4B:
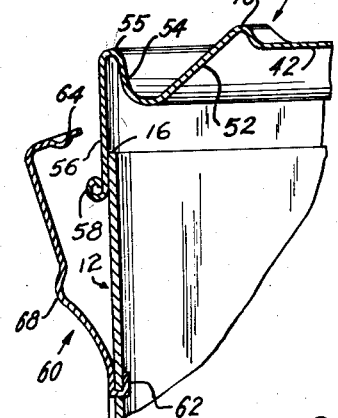
FIG. 4b is a similar view showing the lugs unlatched whereby the covering head may be lifted and then reapplied relative to the drum side walls.
Figure 6:
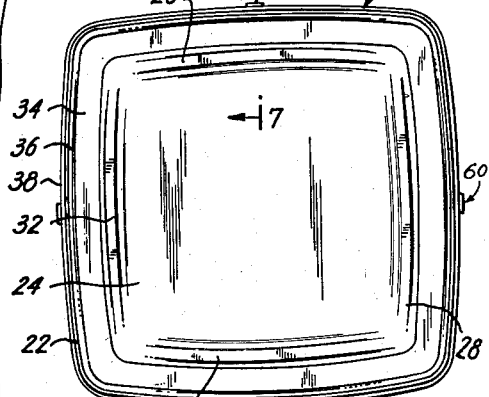
FIG. 6 is a bottom plan view of the drum of FIG. 1.
Figure 7:
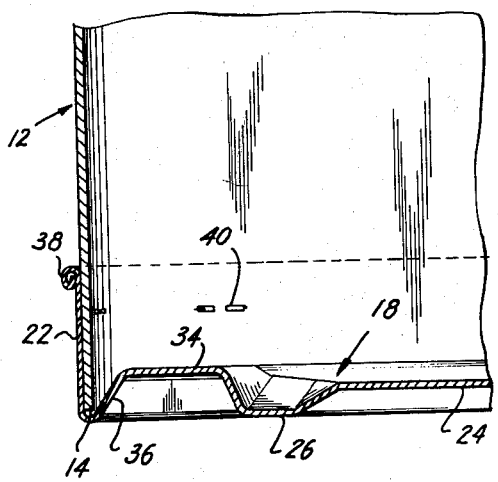
FIG. 7 is an enlarged fragmentary sectional view taken along the line 7—7 of FIG. 6.
Figure 8:
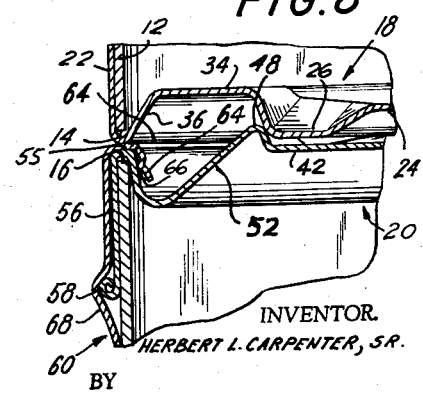
FIG. 8 is a fragmentary sectional view illustrating nesting of my drums.

In order to mount the head 20 in place on the upper end 16 the head is first slipped over this end. The upper end of the lugs are then flexed or shifted radially inwardly so that the tongues 66 will cam over the rim 55 and then drop into locking or latching engagement with the radially inwardly disposed surfaces of the rim 55. At such time, the bead 58 will be embraced by the inner surfaces of the rib 68. This engagement further supplies resistance to unintentional removal of the head from the shell. The other lugs 60 on the drum are similarly flexed inwardly to complete the locking of the head to the shell. The presence of the panels 64 will not hinder the contemplated vertical stacking and nesting of drums. For the permanent shipping of this drum, the panels 64 of the lugs may be bent downwardly firmly against the wall 54 of the top head 20 with a special tool or pincers. In this manner the head 20 is finally locked to the shell 12 in a tight and secure fashion. To open the drum after it has been permanently closed, the panel 64 of the lug 60 need only be bent back to its normal position with a screw driver or tool. This permanent locking of the head 20 to the shell is illustrated in phantom in FIG. 4a and by solid lines in FIG. 8.

The transversely convex and arch-like configuration of the drum 10 provides for superior sealing and fit between the closures, particularly the head and the drum shell since any force asserted against the corners of the shell will induce the side walls to bow outwardly into tight engagement with the closures. The convex side in rounded corners of the drum 10, when supported and embraced inwardly as well as outwardly by the head, will thusly provide for a mechanically strong and tight closure.

As will be appreciated, the particular complementary configuration of the disclosed bottom closure and head, together with shell, permits the utilization of seals and gasket to create hermetic conditions and thereby minimize container content contamination and the like. In this connection, special interliners, coatings and film liners may be employed interiorly of the drum or at the junctures between drum shell, bottom closure and head. These liners may be formed from fibrous, resinous or metallic sheet material. Coatings, on the other hand, may be of a resinous nature or of an asphaltic composition as conventionally utilized in the art. The gasket, naturally, may be formed from suitable rubber, both natural or synthetic, or for that matter, suitable resinous materials.

From the foregoing description, it will be appreciated that I have provided an improved fiber drum having a plurality of sides and which is economical in the utilization of space. Furthermore, I have provided a rugged, strong and serviceable container which can withstand the use and abuse normally encountered during shipping and storage. At the same time, I have contributed to the art a drum of this nature which provides for superior fit and a substantially tight non-sifting sealing relationship with its bottom closure and upper head, both of which are expeditiously mounted in a slip-on manner.

Modifications may, of course, be made in the illustrated and described embodiment of my invention without departing from the invention as set forth in the accompanying claim.

I claim:

An improved fiber drum comprising a tubular body having a plurality of sides and made of wound laminated layers of fibrous material, each side of said body being transversely convex, and the corners joining said sides together being rounded, a closure fixedly secured to one end of said body including a depending apron tightly embracing the exterior walls of the body and including transversely convex sides joined together by rounded corners, whereby forces applied transversely to said drum cause said body to tightly engage the apron of the bottom closure, a removable head at the other end thereof, said removable head having a periphery including an apron having transversely convex sides, the corners joining the sides of the apron being rounded, the interior of the apron being in close proximity with exterior surfaces of said body whereby forces applied transversely to said drum cause said body to tightly engage the apron of the removable head, lug means on each side of said body at its upper end, including a shiftable strip having one end anchored to said body, said lug means being anchored to the walls of said body at one end of said strip by collapsible tongues integrally extending from said strip and being disposed in tight engagement with the interior of said body, the other end of said strip having a transversely and inwardly extending portion including a nipple, said strip possessing limited flexibility, said head including a circumferentially extending rim, latching means including the rim of said head and the nipple of the transversely extending portion of said strip for releasably locking said head to said body when said strip is shifted over said head whereupon said nipple is adapted to cam over said rim into releasable engagement therewith and to permit removal of said closure when said strip is shifted away from said head whereupon said nipple releases its engagement with said rim, and said downwardly depending apron of said head including an outwardly and upwardly rolled bead, said strip including a transverse rib adapted to accommodate said bead when said strip is shifted to a locked position at which the head is locked to said body, said bottom closure and head including complementary raised and recessed cooperating surfaces for permitting the interlocking of said drum with another identical drum, vertically stacked one upon the other with said bottom closure of the upper drum nesting with the head of the lower drum.

References Cited by the Examiner

UNITED STATES PATENTS

| 1,815,970 | 7/31 | Eggerss | 229—47 X |
| 1,992,182 | 2/35 | Buist | 229—4.5 |
| 2,153,122 | 4/39 | Powell | 229—47 |
| 2,419,616 | 4/47 | White | 229—5.7 |
| 2,718,995 | 9/55 | Carpenter | 229—47 X |

FOREIGN PATENTS 1,095,645  12/60  Germany.

GEORGE O. RALSTON, *Primary Examiner.*

EARLE J. DRUMMOND, *Examiner.*